UNITED STATES PATENT OFFICE.

FRANCIS C. HOOTON, OF WEST CHESTER, PENNSYLVANIA.

IMPROVEMENT IN PRESERVING FRUITS AND VEGETABLES.

Specification forming part of Letters Patent No. 117,884, dated August 8, 1871.

*To all whom it may concern:*

Be it known that I, FRANCIS C. HOOTON, of West Chester, county of Chester and State of Pennsylvania, have invented a certain Process by which Fruits, Vegetables, and other substances perishable in nature and liable to decay may be preserved for an indefinite period of time and without injury to the fruit or substance so preserved.

Putrefaction or decay of any organic substance first commences with the absorption of oxygen from the atmosphere. Any organic substance, therefore, in proximity or in contact with any absorbent of oxygen would be in a measure exempt from decay; or, in other words, the process of decomposition would be measurably arrested. If a material is used which at the same time absorbs the surrounding oxygen of the atmosphere and also the gases that are given off in decomposition of the substances, the elements of destruction are wholly overcome and the substance is preserved intact as long as the means employed are operative. Nor is actual contact of the substance to be preserved with the preservative material necessary, as in many cases such contact would prove injurious.

Air-slaked lime or "fallen lime" meets this double requirement above stated, viz., by absorbing the oxygen in the atmosphere surrounding the article to be preserved, and also absorbing the sulphureted hydrogen and other gases that may already have been formed incipiently in the article desired to be preserved, thus arresting putrefaction and preventing the action of the ever-present element of decay, the oxygen of the atmosphere. Air-slaked or fallen lime, having lost its carbonic acid, is in the proper condition to act as a powerful absorbent, and by this reason is the result accomplished which I have above stated, a condition not had by the use of lime in any other form.

From the above description it is obvious that the preservative qualities of air-slaked lime are due to the fact that when the lime is made use of for the purposes specified it is only partially slaked. This will be apparent from the following explanation: Lime freshly burned, when brought in contact with water, gives out its carbonic acid rapidly, with evolution of heat, and absorbs oxygen and hydrogen, the elements of the water, so that when the operation is complete the lime becomes the hydrated oxide. Now, when lime is dry-slaked by the air the process of slaking is much slower than by water, and when in the condition termed fallen lime it becomes the sesquioxide or subcarbonate of lime, or lime half-slaked. Hence it is that, until this lime is thoroughly slaked by contact with air, it performs the double function or chemical action above stated, viz., the absorption of the oxygen of the surrounding atmosphere, the source of putrefactive decomposition of a body organic in nature, and also the gases or products of decomposition, thereby arresting incipient decay, present always in all matured fruits, vegetables, &c. This fully explains why fallen lime, as I have discovered, acts so powerfully as a preservative of perishable substances; and it will so continue to act until every particle of lime is slaked by the surrounding atmosphere in which the articles preserved are kept. This can easily be known by taking a small portion of the lime used at any time and adding to it a little water, and if no heat is evolved we may presume the lime to be thoroughly slaked and unfit for further use for the purpose intended.

To increase the absorbent action of the gases of decomposition, especially in meats and such like substances desired to be preserved, it is found that the chloride of lime answers a better purpose than the wholly slaked or hydrated oxide of lime. I therefore add chloride of sodium in sufficient quantity to convert the fallen or partially-slaked lime, as fast as it becomes wholly slaked by contact with the surrounding atmosphere, into the chloride. The employment of chloride of sodium is entirely optional, however, as in most cases, where substances of a perishable nature are to be preserved, it will be found that the "felled" lime alone will answer the purpose for a sufficient length of time, for the reasons above stated.

Fruits having sufficient thickness of rind are placed directly in contact with the lime, in a barrel or other convenient vessel, a layer of fruit or vegetables and a layer of fallen lime, so that each individual fruit or vegetable is covered with the lime. Articles of a more delicate nature on the exterior may be placed in earthen or porous jars and the vessel surrounded by a layer of the lime. In this way meats, &c., may be preserved for an indefinite length of time uninjured.

Of course in air-slaking the lime the process should be as dry as possible, so as to keep the lime as free as possible from moisture. To this end a current of dry air may be used to "fell" or slake the lime; or the process may be done in the open air during a dry and warm season, when the atmosphere is the least charged with humidity.

I do not claim any new chemical quality of lime thus prepared; but

What I claim as my invention is—

The process of applying air-slaked or felled lime to all organic substances perishable in their nature, in combination with or without chloride of sodium, so as to absorb the oxygen of the surrounding atmosphere and the gases of decomposition, and thus arrest decay, substantially as described.

FRANCIS C. HOOTON.

Witnesses:
J. R. HAYES,
GEO. F. SPICER.